United States Patent
Poetsch

[11] 3,926,999
[45] Dec. 16, 1975

[54] 4-(PHENYL)-PIPERAZINO HALO ALKENONES AND ALKANONES

[75] Inventor: Eike Poetsch, Darmstadt, Germany

[73] Assignee: Merck Patent Gesellschaft Mit Beschraenkter Haftung, Darmstadt, Germany

[22] Filed: Jan. 9, 1973

[21] Appl. No.: 322,184

[30] Foreign Application Priority Data
Jan. 15, 1972 Germany............................ 2201889

[52] U.S. Cl..... 260/268 PH; 260/240 R; 260/240 J; 260/268 BI; 424/250
[51] Int. Cl.² ....................................... C07D 295/12
[58] Field of Search...... 260/268 PH, 268 BI, 240 J, 260/240 K, 240 R

[56] References Cited
OTHER PUBLICATIONS
N. Nazarov et al., Chemical Abstracts, Vol. 39, p. 16219, (1945).

*Primary Examiner*—Donald G. Daus
*Assistant Examiner*—Jose Tovar
*Attorney, Agent, or Firm*—Millen, Raptes & White

[57] ABSTRACT

Arylpiperazines of the formula R-A-Z wherein R is

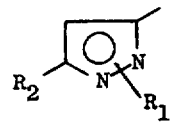

or $R_2-O-$, in which $R_1$ is H, alkyl, Ar or $COR_3$; $R_2$ is H or alkyl; $R_3$ is alkyl, aralkyl or substituted or unsubstituted aryl, and Q is $-CX_1=CH-CO-$, $-C\equiv C-CO-$, $-CH=CX_1-CO-$, $-CHX_1-CHX_1-CO-$, $-CO-CH=CX_1-$, $-CO-C\equiv C-$, $-CO-CX_1=CH-$ or $-CO-CHX_1-CHX_1$; $X_1$ is a functional group; A is $C_nH_{2n}$ in which $n$ is 1-4; Z is

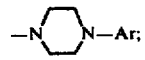

and Ar is unsubstituted or substituted phenyl; are produced by recting a carbonyl compound of the formula $R_2-Q-Y$ wherein Y is $-A-X_1$ or $-C_nH_{2n-1}$, with a compound of the formula H—Z to produce novel intermediate products of the formula $R_2-Q-A-Z$ which can then be reacted with a hydrazine derivative of the formula $R_1-NH-NH_2$ to produce a pyrazolylalkyl piperazine as defined above.

14 Claims, No Drawings

4-(PHENYL)-PIPERAZINO HALO ALKENONES AND ALKANONES

BACKGROUND OF THE INVENTION

This invention relates to a process for the preparation of arylpiperazines, more particularly to keto-alkylpiperazines and pyrazolyl-alkylpiperazines, and to novel keto-alkylpiperazines and the physiologically acceptable acid addition salts thereof thus produced.

Physiologically active pyrazolyl-alkylpiperazines and methods for preparing them are described in U.S. Pat. No. 3,491,097 and U.S. Application Ser. No. 231,750, filed Mar. 3, 1972, now U.S. Pat. No. 3,839,336. (German Patent Applications P 16 20 016 and P 21 10 568.) These compounds produce an effect on the central nervous system particularly exhibiting a narcosis-potentiating, sedative, tranquilizing and narcotic effects. A number of the compounds possess blood-pressure lowering, analgesic, antiphlogistic and/or local anesthetic properties. It has now been found that these compounds can be prepared in a particularly advantageous and economical method according to the present invention.

SUMMARY OF THE INVENTION

The present invention relates to a novel process for the preparation of arylpiperazines of the general Formula I $$R-A-Z \qquad I$$

wherein R is

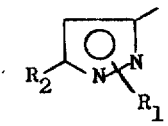

or $R_2-Q-$; $R_1$ is H, alkyl of 1–4 carbon atoms, Ar or $COR_3$; $R_2$ is H or alkyl of 1–4 carbon atoms; $R_3$ is $NH_2$, $N(CH_3)_2$, alkoxy of 1–4 carbon atoms, or optionally unsaturated alkyl or aralkyl each containing up to 10 carbon atoms, respectively, or aryl containing altogether up to 10 carbon atoms and being unsubstituted or substituted by one or more of alkyl, amino and methoxy; Q is $CX_1=CH-CO-$, $-C=C-CO-$, $-CH=CX_1-CO-$, $-CHX_1CHX_1-CO-$, $-CO-CH=CX_1-$, $-CO-C=C-$, $-CO-CX_1=CH-$ or $-CO-CHX_1-CHX_1$; $X_1$ is Cl, Br, I, acyloxy of 1–7 carbon atoms, alkylsulfonyloxy of 1–6 carbon atoms, arylsulfonyloxy of 6–10 carbon atoms, $OR_4$, SH, $SR_4$, $NR_5R_6$, Z or $NH-NH-COR_3$; $R_4$ is alkyl of 1 to 4 carbon atoms, Ar, Ar-alkyl, $-C(COR_2)=CH-A-Z$ or $-CR_2=CH-CO-A-Z$; $R_5$ is H or alkyl of 1–4 carbon atoms and $R_6$ is H, alkyl of a total of up to 30 carbon atoms or the corresponding alkyl substituted by one or more of an optional substituent, particularly by one $-NR_5-CR_2=CH-CO-Y$ group wherein Y is preferably $-ACl$, $-ABr$, $-AZ$ or $-C_nH_{2n-1}$, or Ar, or collectively $R_5$ and $R_6$ are $-(CH_2)_4-$, $-(CH_2)_5-$ or $-(CH_2)_2-O-(CH_2)_2-$; A is $C_nH_{2n}$; $n$ is an integer from 1–4; Z is

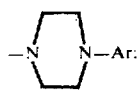

and Ar is phenyl or phenyl substituted by one or more of alkyl and alkoxy, each of 1–4 carbon atoms, trifluoromethyl and halogen and the groups $X_1$ and Ar are identical or different, and the physiologically acceptable acid addition salts thereof which comprises reacting a carbonyl compound of the general Formula II $$R_2-Q-Y \qquad II$$

wherein Y is $-A-X_1$ or $-C_nH_{2n-1}$, with an arylpiperazine of the general Formula III $$H-Z \qquad III$$

to produce novel piperazine intermediates as defined by general Formula I, having the Formula Ia $$R_2-Q-A-Z \qquad Ia$$

which can then be reacted with a hydrazine compound of the formula $R_1-NH-NH_2$ to produce pyrazolyl-alkylpiperazines as defined by general Formula I having the Formula Ib

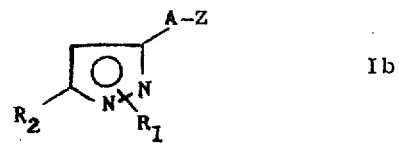

and, if desired, the free bases of Formula Ia and Ib can be isolated as acid addition salts thereof.

This invention also relates to the novel compounds of Formula Ia.

DETAILED DISCUSSION

According to the novel process of this invention, novel intermediates of the general Formula Ia are obtained which can be converted into the pyrazole derivatives of Formula Ib by reaction with a hydrazine derivative of the general formula $R_1-NH-NH_2$ (IV).

If desired, intermediate products of Formula Ia can be converted into other intermediate products falling within the scope of Formula Ia and the latter can then be converted into a compound of Formula Ib by reaction with a compound of Formula IV. The compounds of Formulae Ia or Ib can be converted by treatment with an acid into their corresponding acid addition, preferably physiologically acceptable acid addition salt. Similarly, the acid addition salts can be converted into their corresponding free acid form by the treatment with a base.

In the preceding description and in the disclosure set forth below, unless indicated otherwise, R, $R_1$ to $R_6$, Q, $X_1$, A, $n$, Z and Ar have the same values indicated in Formula I and Y has the same value set forth in Formula II.

Preferred alkyl groups for groups $R_1$ to $R_6$ are methyl, ethyl, n-propyl, isopropyl, n-butyl, iosbutyl, sec.-butyl and tert.-butyl.

The group Ar is preferably unsubstituted phenyl or monosubstituted phenyl, especially o-, m- or p-tolyl, o-, m- or p-chlorophenyl. However, Ar also includes phenyl substituted by more than one alkyl group (1–4 carbon atoms), alkoxy (1–4 carbon atoms) and halogen, including, for example, dimethyl-phenyl, e.g., 2,4-dimethylphenyl, o-, m- or p-ethylphenyl, o-, m- or p-isopropylphenyl, 2-methyl-5-isopropylphenyl, o-, m- or ɔ-methoxyphenyl, dimethoxyphenyl, e.g., 3,4-dimethoxyphenyl, trimethoxyphenyl, e.g., 3,4,5-trimethoxyphenyl, 2-methoxy-5-methylphenyl, o-, m- or p-ethoxyphenyl, o-, m- or p-trifluoromethylphenyl, o-, m- or p-fluorophenyl, 2,3-, 2,4-, 2,5-, 2,6-, 3,4- or 3,5-dichlorophenyl, 2,4,6-trichlorophenyl, o-, m- or p- bromophenyl, dibromophenyl, e.g., 2,4-dibromophenyl, o-, m- or p-iodophenyl.

$R_3$ is preferably lower alkyl, e.g., methyl, ethyl, n-propyl, n-butyl, isobutyl, sec.-butyl and tert.-butyl. $R_3$ also includes other monovalent groups derived from an aliphatic hydrocarbon by the removal of a hydrogen atom, e.g., n-pentyl, isopentyl, n-hexyl, isohexyl, n-heptyl, n-octyl, n-nonyl, or n-decyl, vinyl, allyl, ethinyl; optionally unsaturated aralkyl, e.g., benzyl, 1- or 2-phenylethyl, 1-, 2- or 3-phenylpropyl, 4-phenylbutyl, styryl or phenylethinyl; aryl unsubstituted or substituted by one or more alkyl, amino or methoxy groups, e.g., phenyl, 1- or 2-naphthyl, o-, m- or p-tolyl, 2,4-dimethylphenyl, o-, m- or p-ethylphenyl, p-isopropylphenyl, 2-methyl-5-isopropylphenyl, o-, m- or p-methoxyphenyl, 3,4-dimethoxyphenyl, 3,4,5-trimethoxyphenyl, 2-methoxy-5-methylphenyl, p-aminophenyl or p-dimethylaminophenyl. $R_3$ can also be alkoxy of up to 4 carbon atoms, including methoxy, ethoxy, n-propoxy, isopropoxy, n-butoxy, isobutoxy, sec.-butoxy and tert.-butoxy; or $NH_2$ or dimethylamino.

Q is preferably $-CX_1=CH-CO-$.

In the reaction of a compound of Formula II with a compound of Formula III, the group $X_1$ is split off during the course of the reaction in the formation of the pyrazole derivatives of Formula Ib. Therefore, the nature of this functional group is not critical. In practice, all groups $X_1$ are suitable which can be eliminated during the reaction with compounds of Formulae III or IV, respectively, i.e., preferably those which are eliminated under basic conditions. In the definition of $X_1$, acyloxy preferably means either lower alkanoyloxy, e.g., acetoxy or benzoyloxy; alkysulfonyloxy means lower alkylsulfonyloxy, e.g., methane- or ethanesulfonyloxy; arylsulfonyloxy includes, e.g., benzene-, p-toluene- or naphthalenesulfonyloxy. $X_1$ is preferably Br, Cl or Z.

A is preferably $-CH_2CH_2-$ or $-CH_2CH(CH_3)-$ but can also be, for example, $-CH_2-$, $-CH(CH_3)-$, $-CH_2CH_2CH_2-$, $-CH(CH_3)CH_2-$, $-CH(C_2H_5)-$, $-CH_2CH_2CH_2CH_2-$, $-CH(CH_3)CH_2CH_2-$, $-CH_2CH(CH_3)CH_2-$, $-CH_2CH_2CH(CH_3)-$, $-CH(C_2H_5)CH_2-$, $-CH_2CH(C_2H_5)-$, $-CH(CH_3)CH(CH_3)-$, $-C(CH_3)_2CH_2-$, $-CH_2C(CH_3)_2-$, $-CH(n-C_3H_7)-$ and $-CH(iso-C_3H_7)-$.

Y is preferably $-A-Cl$, $-A-Br$ or an alkenyl group of $n$ carbon atoms wherein $n$ is an integer from 1 to 4.

According to a preferred embodiment of this invention, it is particularly desirable to produce 1-[2-(5-methylpyrazolyl-3)-ethyl]-4-m-chlorophenylpiperazine, which is particularly valuable as a drug. This compound can be prepared by reacting a compound of Formula II wherein $R_2 = CH_3$ and $n = 2$ with a compound of Formula III wherein Z = 4-m-chlorophenylpiperazino and thereafter reacting the thus-obtained intermediate of Formula Ia wherein $R_2 = CH_3$, A = $-CH_2CH_2-$ and Z = 4-m-chlorophenylpiperazino with hydrazine.

Of the compounds of Formula II, the following are preferred:

a. Alkenones of the formula $R_2-CX_1=CH-CO-A-X_1$ (IIa), for example, dichloroalkenones, e.g., 1,5-dichloro-4-hexen-3-one, obtainable, for example, by chemical addition of chloro-fatty acid chlorides of the formula $Cl-CO-A-Cl$ to alkines of the formula $R_2-C \equiv CH$.

b. Alkadienones of the formula $R_2-CX_1=CH-CO-C_nH_{2n-1}$ (IIb), preferably chloroalkadienones, e.g., 5-chloro-1,4-hexadien-3-one, obtainable, for example, by splitting off $HX_1$ from a compound of Formula IIa or from trisubstituted ketones of the formula $R_2-C(X_1)_2-CH_2-CO-A-X_1$ which, in turn, can be produced by the addition of fatty acid derivatives of the formula $X_1-CO-A-X_1$, e.g., $Cl-CO-A-Cl$, to alkenes of the formula $R_2-CX_1=CH_2$, e.g., $R_2-CCl=CH_2$.

c. The alkinones $R_2-C \equiv C-CO-A-X_1$ (IIc), for example, alkinones, e.g., 1-chloro-4-hexyn-3-one, obtainable, for example, by the oxidation of the reaction product of aldehydes of the formula $HOC-A-X_1$ with Na-alkines of the formula $R_2-C \equiv CNa$, said reaction product being a carbinol of the formula $R_2-C \equiv C-CHOH-A-X_1$.

d. Alkeninones of the formula $R_2-C \equiv C-CO-C_nH_{2n-1}$ (IId), e.g., 1-hexen-4-in-3-one, obtainable, for example, by the oxidation of the carbinols of the formula $R_2-C \equiv C-CHOH-C_nH_{2n-1}$, which are obtained by the reaction of unsaturated aldehydes of the formula $HOC-C_nH_{2n-1}$ with Na-alkines of the formula $R_2-C \equiv CNa$.

e. Alkenones of the formula $R_2-CH=CX_1-CO-A-X_1$ (IIe), preferably dichloroalkenones, e.g., 1,4-dichloro-4-hexen-3-one, which can be obtained, for example, by the addition of unsaturated fatty acid derivatives of the formula $R_2-CH=CX_1-COX_1$, e.g., $R_2-CH=CCl-COCl$, to alkenes $(C_nH_{2n})$ in the presence of $AlCl_3$.

f. Alkadienones of the formula $R_2-CH=CX_1-CO-C_nH_{2n-1}$ (IIf), preferably chloroalkadienones, e.g., 4-chloro-1,4-hexadien-3-one, which can be obtained, for example, by splitting off $HX_1$ from a compound of Formula IIe.

g. Alkanones of the formula $R_2-CHX_1-CHX_1-CO-A-X_1$ (IIg), preferably trichloroalkanones, e.g., 1,4,5-trichlorohexan-3-one, which can be obtained, for example, by the addition of fatty acid derivatives of the formula $R_2-CHX_1-CHX_1-COX_1$, e.g., $R_2-CHCl-CHCl-COCl$, to alkenes $(C_nH_{2n})$ in the presence of $AlCl_3$.

h. Alkenones of the formula $R_2-CHX_1-CHX_1-CO-C_nH_{2n-1}$ (IIh), preferably dichloroalkenones, e.g., 4,5-dichloro-1-hexene-3-one, which can be obtained, for example, by splitting off $HX_1$ from a compound of Formula IIg, especially from compounds having differing $X_1$ groups, e.g., 1-bromo-4,5-dichlorohexan-3-one.

i. Alkenones of the formula $R_2-CO-CH=CX_1-A-X_1$ (IIi), preferably dichloroalkenones, e.g., 4,6-dichloro-3-hexen-2-one, which can be obtained, for example, by the addition of fatty acid derivatives of the formula $R_2-CO-X_1$, e.g., $R_2-COCl$, to alkines of the formula $HC \equiv C-A-X_1$.

j. Alkadienones of the formula $R_2-CO-CH=CX_1-C_nH_{2n-1}$ (IIj), preferably chloroalkadienones, e.g., 4-chloro-3,5-hexadien-2-one, which can be obtained, for example, by splitting off $HX_1$ from a compound of Formula IIi.

k. Alkinones of the formula $R_2-CO-C \equiv C-A-X_1$ (IIk), preferably chloroalkinones, e.g., 6-chloro-3-hexyn-2-one, which can be obtained, for example, either by the reaction of aldehydes $(R_2-CHO)$ with Na-alkines $NaC \equiv C-A-X_1$ and thereafter oxidizing the produced carbinols of the formula $R_2-CHOH-C \equiv C-A-X_1$, or by the reaction of ketoalkinols of the formula $R_2$—CO—C≡C—A—OH with, for example, $SOCl_2$ or $PBr_3$.

l. Alkeninones of the formula $R_2$—CO—C≡C—$C_nH_{2n-1}$ (III), e.g., 5-hexene-3-in-2-one, which can be obtained, for example, by the reaction of aldehydes ($R_2$—CHO) with Na-alkines (NaC≡C—$C_nH_{2n-1}$) and thereafter oxidizing the produced carbinols of the formula $R_2$—CHOH—C≡C—$C_nH_{2n-1}$.

m. Alkenones of the formula $R_2$—CO—$CX_1$=A—CH—A—$X_1$ (IIm), preferably dichloroalkenones, e.g., 3,6-dichloro-3-hexen-2-one, which can be obtained, for example, by splitting off $HX_1$ from a compound of Formula IIo (see below).

n. Alkadienones of the formula $R_2$—CO—$CX_1$=A—CH—$C_nH_{2n-1}$ (IIn), preferably chloroalkadienones, e.g., 3-chloro-3,5-hexadien-2-one, which can be obtained, for example, by splitting off $HX_1$ from either compounds of Formulae IIm or IIo (see below).

o. Alkanones of the formula $R_2$—CO—$CHX_1$—$CHX_1$—A—$X_1$ (IIo), preferably trichloroalkanones, e.g., 3,4,6-trichlorohexan-2-one, which can be obtained, for example, by the addition of $(X_1)_2$, e.g., chlorine addition, to alkenones of the formula $R_2$—CO—CH=CH—A—$X_1$.

p. Alkenones of the formula $R_2$—CO—$CHX_1$—$CHX_1$—$C_nH_{2n-1}$ (IIp), preferably dichloroalkenones, e.g., 3,4-dichloro-5-hexen-2-one, which can be obtained, for example, by splitting off $HX_1$ from a compound of Formula IIo, especially from starting substances having differing groups $X_1$, e.g., 3,4-dichloro-6-bromo-hexan-2-one.

The above carbonyl compounds of Formula II can be divided into two groups of compounds, viz., IIa – IIh, on the one hand, and IIi – IIp, on the other hand, in which the members of one group can be converted into another member of the same group by means of the single or multiple addition or splitting off of $HX_1$. For example, a compound of Formula IIg can be converted, by splitting off $HX_1$, via compounds IIa and IIc, into a compound of Formula IId.

Since the subsequent reactions of compounds of Formula II with the arylpiperazines H—Z (III) and/or with the hydrazine derivative $R_1$—NH—$NH_2$ (IV) take place, at least partially, under conditions whereby $HX_1$ can be split off, it is possible that individual reactants corresponding to Formula II will not be isolated but, rather, are only formed in situ or exist only momentarily. For the same reason, it is possible, and also advantageous in a number of cases, to employ mixtures of different compounds of Formula II in the reaction. In addition to the individual compounds of Formula II, it is also possible to employ precursors to the compounds of Formula II which are contained in these mixtures, and from which the compounds of Formula II can then be formed in situ. Thus, it is likewise possible, for example, to utilize derivatives of compounds of Formula II wherein the carbonyl group is functionally modified.

A particularly advantageous and preferred embodiment of this invention resides in employing a mixture obtained by the reaction of a fatty acid derivative of the formula $X_1$—CO—A—$X_1$, e.g., 3-chloropropionyl chloride, with an alkene of the formula $R_2$—$CX_1$=$CH_2$, e.g., 2-chloropropene, as a substitute for a single compound of Formula II. In addition to the corresponding compounds IIa and IIb, the mixture also consists primarily of trisubstituted ketones of the formula $R_2$—$C(X_1)_2$—$CH_2$—CO—A—$X_1$, e.g., 1,5,5-trichlorohexan-3-one. This mixture can then be treated with a base resulting in the splitting off of $HX_1$ and the products produced thereby, e.g., IIa, can be optionally isolated. However, it is more advantageous from a preparative viewpoint to use the mixture directly in the reaction, thus producing the starting compounds IIa and IIb, respectively, in situ.

Individual examples of the aforementioned starting substances, for example, the alkenones of Formula IIa, can furthermore be present in the form of cis- and trans-isomers. They can be employed either in the form of a mixture of these isomers, or in the form of the pure, isolated cis- or trans-components.

If more than one $X_1$ group is present in a compound of Formula II, they are preferably but not necessarily identical. For reasons of practicability, $X_1$ is preferably Cl. However, in individual cases it may also be advantageous, from a preparative point of view, to employ starting compounds with different $X_1$ groups. For example, dibromoalkenones of the formula $R_2$—CBr=CH—CO—A—Br (IIa; both $X_1$ = Br) are obtainable by the addition of bromo-fatty acid bromides of the formula Br—CO—A—Br to alkines of the formula $R_2$—C≡CH in the presence of $AlCl_3$. Acyloxyalkenones of the formula $R_2$-C(OAcyl)=CH—CO—A—Cl (IIa; $X_1$ = OAcyl and Cl, respectively) can be produced by the reaction of chloro-fatty acid chlorides of the formula Cl—CO—A—Cl with isoalkenylacylates of the formula $R_2$—C(OAcyl)=$CH_2$ in the presence of a Lewis acid, e.g., $AlCl_3$. Analogously, a reaction of chloro-fatty acid chlorides with isoalkenyl ethers of the formula $R_2$—$C(OR_4)$=$CH_2$, or with isoalkenyl thioethers of the formula $R_2$—$C(SR_4)$=$CH_2$, results in the production of ether ketones of the formula $R_2$—$C(OR_4)$=CH—CO—A—Cl and thioether ketones of the formula $R_2$—$C(SR_4)$=CH—CO—A—Cl, respectively.

Arylpiperazines of the formula H—Z (III) are known.

Compounds of Formulae II and III can be reacted in a molar ratio of 1:1 or in the presence of an excess of one of the reactants. In many cases, it is advisable to employ an excess of the arylpiperazine III, especially when a compound of Formula II contains several $X_1$ groups. Although an excess of one of the reaction components can simultaneously serve as the solvent for the reaction, the reaction is advantageously conducted in the presence of an additional inert solvent. Examples of suitable solvents include hydrocarbons, e.g., hexane, cyclohexane, benzene, toluene, xylene; ethers, e.g., diethyl ether, diisopropyl ether, 1,2-dimethoxyethane, tetra-hydrofuran, dioxane; nitriles, e.g., acetonitrile; alcohols, e.g., methanol, ethanol, n-propanol, isopropanol, n-butanol or 2-ethoxyethanol; amides, e.g., dimethylformamide, dimethylacetamide, N-methylpyrrolidone, tetramethylurea, hexamethylphosphoric triamide; sulfoxides, e.g., dimethyl sulfoxide; chlorinated hydrocarbons, e.g., methylene chloride, chloroform, carbon tetrachloride, trichloroethylene, 1,2-dichloroethane, chlorobenzene; ketones, e.g., acetone or butanone; and mixtures thereof. Furthermore, mixtures of at least one solvent with water are also suitable. Acetonitrile is particularly preferred as a solvent.

The reaction is suitably carried out at temperatures between −20° and +150° C., and preferably between 20° and 100° C. Normally, the reaction takes place smoothly at ambient temperature.

Reaction times range between several minutes and several days, depending on the starting material employed and on the selected reaction temperature. It is also possible to add an acid-neutralizing agent, e.g., an organic base, for example, triethylamine, dimethylaniline, pyridine, quinoline or other tertiary amine.

It is also possible to convert the products corresponding to Formula Ia into another product of Ia, for example, prior to the further reaction with the hydrazine derivative IV. In particular, the conversion of a product of Formula Ia wherein $X_1 = Cl$ or another group into a piperazine derivative corresponding to Formula Ia wherein $X_1 = Z$ is of practical importance. These intermediates can be produced when using an excess of arylpiperazine of Formula II during the reaction of compounds of Formulae II with III.

Consequently, the following compounds are of particular importance among the compounds of Formula Ia:

A. Alkenones of the formula $R_1$—$CX_1$=CH—CO—A—Z (Iaa), preferably chloroalkenones ($R_2$—CCl=CH—CO—A—Z), e.g., the cis- or trans-1-(4-m-chlorophenylpiperazino)-5-chloro-4-hexen-3-one, and the bis-piperazinoketones $R_2$—CZ=CH—CO—A—Z, e.g., 1,5-bis(4-m-chlorophenylpiperazino)-4-hexen-3-one.

B. Alkinones of the formula $R_2$—C≡C—CO—A—Z (Iab), e.g., 1-(4-m-chlorophenylpiperazino)-4-hexyn-3-one.

C. Alkenones of the formula $R_2$—CH=$CX_1$—CO—A—Z (Iac), preferably chloroalkenones ($R_2$—CH=CCl—CO—A—Z), e.g., cis- or trans-1-(4-m-chlorophenylpiperazino)-4-chloro-4-hexen-3-one, and bis-piperazinoketones of the formula $R_2$—CH=CZ—CO—A—Z, e.g., 1,4-bis(4-m-chlorophenylpiperazino)-4-hexen-3-one.

D. Alkanones of the formula $R_2$—$CHX_1$—CHX$_1$—CO—A—Z (Iad), preferably dichloroalkanones ($R_2$—CHCl—CHCl—CO—A—Z), e.g., 1-(4-m-chlorophenylpiperazino)-4,5-dichlorohexan-3-one.

E. Alkenones of the formula $R_2$—CO—CH=$CX_1$—A—Z (Iae), preferably chloroalkenones ($R_2$—CO—CH=CCl—A—Z), e.g., 4-chloro-6-(4-m-chlorophenylpiperazino)-3-hexen-2-one.

F. Alkinones of the formula $R_2$—CO—C≡C—A—Z (Iaf), e.g., 6-(4-m-chlorophenylpiperazino)-3-hexyn-2-one.

G. Alkenones of the formula $R_2$—CO—$CX_1$=CH—A—Z (Iag), preferably chloroalkenones ($R_2$—CO—CCl=CH—A—Z), e.g., cis- or trans-3-chloro-6-(4-m-chlorophenylpiperazino)-3-hexen-2-one or the bis-piperazinoketones ($R_2$—CO—CZ=CH—A—Z), e.g., 3,6-bis(4-m-chlorophenylpiperazino)-3-hexen-2-one.

H. Alkanones of the formula $R_2$—CO—CHX$_1$—CHX$_1$—A—Z (Iah), preferably dichloroalkanones ($R_2$—CO—CHCl—CHCl—A—Z), e.g., 3,4-dichloro-6-(4-m-chlorophenylpiperazino)-hexan-2-one.

The preferred chloropiperazinoketones of Formula Ia ($X_1 = Cl$), especially those of Formula Iaa, can be converted into other compounds of Formula Ia wherein $X_1$ is, for example, Z, $NR_5R_6$, $SR_4$, SH, $OR_4$, or NH—NH—$COR_3$. This conversion can be accomplished, for example, by reaction with arylpiperazines (III), or other primary or secondary, e.g., aliphatic or aromatic, amines or diamines, alkali metal sulfides, hydrogen sulfides, alcoholates, phenolates, mercaptides, or with acylhydrazines.

All of these compounds can be converted, if desired, by reaction with hydrazine derivatives of Formula IV, as described below, into pyrazole compounds of Formula Ib. Typical products are, for example, those derived from Formula Iaa with the following partial formulae: the aforementioned bis-piperazinoketones ($R_2$—CZ=CH—CO—A—Z); the aminoketones ($R_2$—C($NR_5R_6$)=CH—CO—A—Z), e.g., the arylaminoketones ($R_2$—C(NHAr)=CH—CO—A—Z), the alkyl-aminoketones ($R_2$—C(NHAlkyl)=CH—CO—A—Z), the dialkylaminoketones ($R_2$—C(NAlkyl$_2$)=CH—CO—A—Z), the pyrrolidino-, piperidino-, or morpholinoketones (Iaa; $X_1$ = pyrrolidino, piperidino or morpholino); the thioether ketones ($R_2$—C(SAlkyl)=CH—CO—A—Z, $R_2$—C(SAryl)=CH—CO—A—Z or S(—$CR_2$=CH—CO—A—Z); the mercapto ketones ($R_2$—C(SH)=CH—CO—A—Z); the ether ketones ($R_2$—C(OAlkyl)=CH—CO—A—Z, $R_2$—C(OAryl)=CH—CO—A—Z, or O(—$CR_2$=CH—CO—A—Z)$_2$); and the acylhydrazino ketones ($R_2$—C(NH—NH—$COR_3$)=CH—CO—A—Z).

If desired, the thus-formed product Ia can be reacted with a hydrazine derivative of Formula IV to a pyrazole of Formula Ib. This reaction can be conducted in a conventional manner, suitably in one of the above-disclosed inert solvents. Suitable hydrazine derivatives are, for example, hydrazine (preferably in the form of an 80% aqueous solution of its hydrate), methylhydrazine, phenylhydrazine, acetylhydrazine, etc. The reaction is advantageously conducted at temperatures of between 0° and 100° C. and is terminated after a few minutes to 10 hours.

It is also possible to produce the hydrazine derivative in situ, for example, by mixing an aqueous or alcoholic solution of the sulfate or hydrochloride thereof with equivalent amounts of an aqueous solution of an alkali metal hydroxide, e.g., sodium hydroxide solution and potassium hydroxide solution.

The reaction mixtures can be worked up easily with the aid of the conventional extraction, distillation and crystallization methods.

If the residue $R_1$ in the hydrazine derivative of Formula IV is different from H, then two isomers can be obtained in the reaction converting a compound of Formula Ia to a compound of Formula Ib, which differ with respect to the position of their double bonds and the residue $R_1$ in the pyrazole ring. These isomers correspond to the compounds of Formulae Iba and Ibb, respectively:

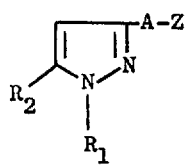    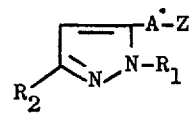

Iba                      Ibb

The subject matter of this invention includes the formation of a mixture of these isomers, as well as the formation of the pure isomers.

It is likewise possible to convert pure isomers of Formula Iba or Ibb (e.g., wherein $R_1 = COR_3$) into one another by heating. Thus, the thermodynamically more stable isomer can be formed, or mixtures can once again be produced. Conversely, it is also possible to obtain, by heating, a pure isomer, preferably the isomer which is more stable thermodynamically, from the mixture. Mixtures of compounds of Formulae Iba and Ibb can be separated in a conventional manner on the basis of their differing solubilities and optionally by means of chromatographical methods.

As noted above, the compounds of Formula I can be converted into acid addition, preferably physiologically acceptable acid addition salts by means of an acid in a conventional manner. When the product is to be employed as a drug rather than an intermediate, only those acids which yield physiologically acceptable salts are employed. Thus, it is possible to employ organic and inorganic acids, including, for example, aliphatic, alicyclic, araliphatic, aromatic or heterocyclic mono- or poly- basic carboxylic or sulfonic acids, e.g., formic acid, acetic acid, propionic acid, pivalic acid, diethylacetic acid, malonic acid, lactic acid, succinic acid, pimelic acid, fumaric acid, maleic acid, tartaric acid, malic acid, aminocarboxylic acids, sulfamic acid, benzoic acid, salicylic acid, phenylpropionic acid, citric acid, gluconic acid, ascorbic acid, nicotinic acid, isonicotinic acid, methanesulfonic acid, ethanedisulfonic acid, 2-hydroxyethanesulfonic acid, p-toluenesulfonic acid, naphthalenemono- and -disulfonic acids, sulfuric acid, nitric acid, hydrohalic acids, e.g., hydrochloric acid or hydrobromic acid, or phosphoric acids, e.g., orthophosphoric acid. Nonphysiologically acceptable acids can be employed for isolation, purification or characterization purposes.

The free base form of compounds of Formula I can be obtained from the acid addition salts thereof, if desired, by treatment with a base, e.g., NaOH, KOH, $Na_2CO_3$ or $K_2CO_3$.

The products of the process can be employed in a mixture with conventional excipients in human or veterinary medicine, e.g., in the manner described in U.S. Pat. No. 3,491,097 and Ser. No. 231,750.

The temperatures herein are set forth in degrees Celsius.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1 a. A solution of 1.30 g. of cis-5-chloro-1,4-hexadien-3-one in 8 ml. of ether is combined with a solution of 1.97 g. of 1-m-chlorophenylpiperazine in 8 ml. of ether. The reaction mixture is allowed to stand for 15 minutes, and then evaporated, thus obtaining cis-1-(4-m-chlorophenylpiperazino)-5-chloro-4-hexen-3-one, m.p. 65–74°.

Analogously, trans-1-(4-m-chlorophenylpiperazino)-5-chloro-4-hexen-3-one (m.p. 76°–77°) is obtained from trans-5-chloro-1,4-hexadien-3-one; and from mixtures of cis- and trans-5-chloro-1,4-hexadien-3-one, mixtures of cis- and trans-1-(4-m-chloro-phenyl-piperazino)-5-chloro-4-hexen-3-one are produced.

In an analogous manner, the compounds set forth below are prepared with 1-phenylpiperazine, 1-o-chlorophenylpiperazine, 1-p-chlorophenylpiperazine, 1-m-tolylpiperazine, 1-p-tolylpiperazine, 1-m-tert.-butylphenylpiperazine, and 1-p-methoxyphenylpiperazine, respectively:

cis-1-(4-phenylpiperazino)-5-chloro-4-hexen-3-one
trans-1-(4-phenylpiperazino)-5-chloro-4-hexen-3-one
cis-1-(4-o-chlorophenylpiperazino)-5-chloro-4-hexen-3-one
trans-1-(4o-chlorophenylpiperazino)-5-chloro-4-hexen-3-one
cis-1-(4-p-chlorophenylpiperazino)-5-chloro-4-hexen-3-one
trans-1-(4-p-chlorophenylpiperazino)-5-chloro-4-hexen-3-one
cis-1-(4-m-tolylpiperazino)-5-chloro-4-hexen-3-one
trans-1-(4-m-tolylpiperazino)-5-chloro-4-hexen-3-one
cis-1-(4-p-tolylpiperazino)-5-chloro-4-hexen-3-one
trans-1-(4-p-tolylpiperazino)-5-chloro-4-hexen-3-one
cis-1-(4-m-tert.-butylphenylpiperazino)-5-chloro-4-hexen-3-one
trans-1-(4-m-tert.-butylphenylpiperazino)-5-chloro-4-hexen-3-one
cis-1-(4-p-methoxyphenylpiperazino)-5-chloro-4-hexen-3-one
trans-1-(4-p-methoxyphenylpiperazino)-5-chloro-4-hexen-3-one
cis-1-(4-m-trifluoromethylphenylpiperazino)-5-chloro-4-hexen-3-one
trans-1-(4-m-trifluoromethylphenylpiperazino)-5-chloro-4-hexen-3-one.

The starting materials can be obtained as follows:

Gaseous 2-chloropropene is obtained by the reaction of equimolar amounts of phosphorus pentachloride and acetone; this gas is passed in an excess under agitation into a receiver cooled to 0°, charged with 270 ml. of $CCl_4$, 120 g. of $AlCl_3$, and 114 g. of 3-chloropropionyl chloride. The reaction mixture is poured on ice water, allowed to stand in this condition for 30 minutes, the organic layer is separated, and the aqueous phase is extracted several times with $CCl_4$. The combined organic phases are dried over magnesium sulfate and concentrated by evaporation, thus obtaining a mixture (designated hereinbelow as "mixture A") consisting, according to the nuclear resonance spectrum, of about 65 mole percent of 1,5,5-trichlorohexan-3-one, about 28 mole % of trans-1,5-dichloro-4-hexen-3-one, and approximately 7 mole % of cis-1,5-dichloro-4-hexen-3-one; additionally, traces of cis- and trans-5-chloro-1,4-hexadien-3-one are found therein.

95.4 g. of "mixture A" is dissolved in 1 liter of acetonitrile and mixed dropwise, under cooling and agitation in a nitrogen atmosphere, at 10°–20°, with 84 g. of triethylamine within 1 hour. The reaction mixture is stirred for another hour at room temperature, the solvent is distilled off, and the residue is treated with ether. The thus-obtained ether solution is dried, evaporated, and the residue ("B") is chromatographed on silica gel with petroleum ether/ether. The eluates are concentrated (separately) by evaporation, distilled, and the products thus obtained are trans-5-chloro-1,4-hexadien-3-one (b.p. 55°–56°/16 mm.) and cis-5-chloro-1,4-hexadien-3-one (b.p. 79°–81°/16 mm.).

By omitting the step of chromatographing the product and by directly distilling the residue B, one obtains a mixture of trans- and cis-5-chloro-1,4-hexadien-3-one (b.p. 60°–80°/20 mm.).

b. A solution of 3.27 g. of cis- or trans-1-m-chlorophenylpiperazino-5-chloro-4-hexen-3-one (or mixture of isomers) in 25 ml. of acetonitrile is mixed under shaking with 1.25 g. of 80% strength hydrazine hydrate. The reaction mixture is allowed to stand for 1 hour, evaporated, worked up with benzene/water, and the benzene phase is filtered over silica gel, thus producing 1-[2-(5-methylpyrazolyl-3)-ethyl]-4-m-chlorophenylpiperazine, m.p. 106°. Dihydrochloride, m.p. 230°. Trihydrochloride, m.p. 225°–226°.

Analogously, by reacting the corresponding 1-(4-aryl-piperazino)-5-chloro-4-hexen-3-ones with hydrazine hydrate, the following final products are obtained:

1-[2-(5-methylpyrazolyl-3)-ethyl]-4-phenylpiperazine, dihydrochloride hydrate, m.p. 174°–176°;

1-[2-(5-methylpyrazolyl-3)-ethyl]-4-o-chlorophenylpiperazine, dihydrochloride, m.p. 216°–218°;

1-[2-(5-methylpyrazolyl-3)-ethyl]-4-p-chlorophenylpiperazine, trihydrochloride, m.p. 218°–220°;

1-[2-(5-methylpyrazolyl-3)-ethyl]-4-m-tolylpiperazine, m.p. 99°–100°; trihydrochloride dihydrate, m.p. 234–236°;

1-[2-(5-methylpyrazolyl-3)-ethyl]-4-p-tolylpiperazine, trihydrochloride dihydrate, m.p. 226°–228°;

1-[2-(5-methylpyrazolyl-3)-ethyl]-4-m-tert.-butylphenylpiperazine, trihydrochloride, m.p. 231°–233°;

1-[2-(5-methylpyrazolyl-3)-ethyl]-4-p-methoxyphenylpiperazine, trihydrochloride hydrate, m.p. 250°–252°;

1-[2-(5-methylpyrazolyl-3)-ethyl]-4-m-trifluoromethylphenyl-piperazine, trihydrochloride, m.p. 231°–233°.

EXAMPLE 2 a. A solution of 1.30 g. of cis- or trans-5-chloro-1,4-hexadien-3-one in 13 ml. of acetonitrile is mixed dropwise under agitation and cooling with a solution of 5.85 g. of m-chlorophenylpiperazine in 10 ml. of acetonitrile. The reaction mixture is allowed to stand for 2 days at 20° and another 3 days at 0°; the thus-precipitated m-chlorophenylpiperazine hydrochloride is filtered off, the filtrate is evaporated, and trans-1,5-bis(4-m-chlorophenylpiperazino)-4-hexen-3-one is obtained as a viscous oil which decomposes when attempting a purification by chromatography or distillation.

Analogously, the following products are prepared from the corresponding arylpiperazines:

trans-1,5-bis(4-phenylpiperazino)-4-hexen-3-one trans-1,5-bis(4-o-chlorophenylpiperazino)-4-hexen-3-one trans-1,5-bis(4-p-chlorophenylpiperazino)-4-hexen-3-one trans-1,5-bis(4-m-tolylpiperazino)-4-hexen-3-one trans-1,5-bis(4-p-tolylpiperazino)-4-hexen-3-one trans-1,5-bis(4-m-tert.-butylphenylpiperazino)-4-hexen-3-one trans-1,5-bis(4-p-methoxyphenylpiperazino)-4-hexen-3-one trans-1,5-bis(4-m-trifluoromethylphenylpiperazino)-4-hexen-3-one.

b. 4.87 g. of crude trans-1,5-bis(4-m-chlorophenylpiperazino)-4-hexen-3-one is dissolved in 40 ml. of acetonitrile, mixed with 0.64 g. of 80% strength hydrazine hydrate, and stirred for 1 hour. The reaction mixture is worked up according to the method set forth in Example 1(b), thus obtaining 1-[2-(5-methyl-pyrazolyl-3)-ethyl]-4-m-chlorophenylpiperazine, m.p. 106°.

c. A solution of 4.87 g. of crude trans-1,5-bis(4-m-chlorophenylpiperazino)-4-hexen-3-one in 40 ml. of acetonitrile is mixed with 0.46 g. of methylhydrazine, refluxed for 1 hour, and concentrated by evaporation. The residue is chromatographed on silica gel with acetone/benzene/chloroform/methanol (8:6:4:1), thus obtaining 1-[2-(1,5-dimethylpyrazolyl-3)-ethyl]-4-m-chlorophenylpiperazine (dihydrochloride, m.p. 200°–201°) and 1-[2-(1,3-dimethylpyrazolyl-5)-ethyl]-4-m-chlorophenylpiperazine (trihydrochloride hydrate, m.p. 209°–210°).

Analogously, the following compounds are produced by reaction with phenylhydrazine (3 hours at 82°; solvents for chromatography: benzene/ethyl acetate 3:2):

1-[2-(1-phenyl-5-methylpyrazolyl-3)-ethyl]-4-m-chlorophenylpiperazine (m.p. 70°–71°; trihydrochloride hydrate, m.p. 190°–195°) and 1-{2-(1-phenyl-3-methylpyrazolyl-5)-ethyl]-4m-chlorophenylpiperazine (diperchlorate hemihydrate, m.p. 230°–232°).

EXAMPLE 3

Under agitation, a solution of 19.7 g. of 1-m-chlorophenylpiperazine in 40 ml. of acetonitrile is added dropwise to a solution of 4.4 g. of "mixture A" (see Example 1(a)) in 100 ml. of acetonitrile; the mixture is refluxed for 1 hour, cooled, and the thus-formed 1-m-chlorophenylpiperazine hydrochloride is filtered off. The filtrate contains 1,5-bis(4-m-chlorophenylpiperazino)-4-hexen-3-one, which is not isolated. To the reaction mixture, there is added under agitation 1.8 ml. of 80% hydrazine hydrate, stirred for another 2 hours at room temperature, and evaporated. The residue is dissolved in a mixture of acetone, benzene, chloroform, and methanol (4:3:2:1), filtered over silica gel, and evaporated, thus producing 1-[2-(5-methylpyrazolyl-3)-ethyl]-4-m-chlorophenylpiperazine, m.p. 106°. From the silica gel, 1-m-chlorophenylpiperazine can be recovered.

Analogously, the corresponding 1-[2-(5-methylpyrazolyl-3)-ethyl]-4-arylpiperazines can be obtained from the corresponding arylpiperazines via the corresponding 1,5-bis-arylpiperazino-4-hexen-3-ones.

EXAMPLE 4 a. Under agitation and cooling, a solution of 3.94 g. of 1-m-chlorophenylpiperazine is added dropwise to a solution of 1.67 g. of a 3:1 mixture (b.p. 68°–72°/1 mm.) of trans- and cis-1,5-dichloro-4-hexen-3-one in 12 ml. of ether. The mixture is allowed to stand for 1 hour at 20°, filtered, the filtrate evaporated, and the product thus obtained is 1-(4-m-chlorophenylpiperazino)-5-chloro-4-hexen-3-one (mixture of isomers, oily).

The starting mixture is obtainable by refluxing 19.1 g. of "mixture A" (see Example 1(a)) for 1 hour with 20 g. of dimethylaniline in 150 ml. of acetonitrile under $N_2$, or by adding 740 g. of 1,2-dichloropropane dropwise to a solution of 918 g. of KOH in 3.3 l. of diethylene glycol monoethyl ether at 150° and introducing the thus-formed propyne into a mixture of 456 g. of 86% strength 3-chloropropionyl chloride, 480 g. of $AlCl_3$, and 1.3 l. of chloroform at 0°–5°.

b. Respectively 3.27 g. of 1-(4-m-chlorophenylpiperazino)-5-chloro-4-hexen-3-one (mixture of isomers) is reacted with the following compounds (conditions in parentheses):

ba. 3.93 g. of 1-m-chlorophenylpiperazine (in 25 ml. of acetonitrile; 1 hour at 82°);
bb. 2.55 g. of m-chloroaniline (in 50 ml. of acetonitrile; 6 hours at 82°);
bc. 1.74 g. of morpholine (in 50 ml. of acetonitrile; 1 hour at 25°);
bd. 1.46 g. of n-butylamine (in 50 ml. of acetonitrile; 2 hours at 82°);
be. 1.2 g. of $Na_2S.9\ H_2O$ (in 20 ml. of acetonitrile/methanol 1:1; 16 hours at 25°);
bf. 0.68 g. of sodium ethylate (in 20 ml. of acetonitrile/methanol 1:1; 1 hour at 25°);
bg. 1.16 g. of sodium phenolate (same procedure as in (be));
bh. potassium hydrogen sulfide (obtained by saturating a solution of 0.56 g. of KOH in 40 ml. of N-methylpyrrolidone with $H_2S$; 1 hour at 15°–30°);
bi. 0.84 g. of sodium ethylmercaptide (in 40 ml. of N-methylpyrrolidone; 2 hours at 25°);
bj. 1.48 g. of acetylhydrazine (in 30 ml. of acetonitrile; 30 minutes at 82°);
bk. 1.56 g. of ethylenediamine monohydrate (in 30 ml. of acetonitrile; 60 hours at 25°).

After filtration, evaporation, and chromatography on silica gel, the following substances are thus produced:

ba. trans-1,5-bis(4-m-chlorophenylpiperazino)-4-hexen-3-one, oily;
bb. cis-1-(4-m-chlorophenylpiperazino)-5-m-chloroanilino-4-hexen-3-one, m.p. 110°–113°;
bc. trans-1-(4-m-chlorophenylpiperazino)-5-morpholino-4-hexen-3-one, oily;
bd. cis-1-(4-m-chlorophenylpiperazino)-5-n-butylamino-4-hexen-3-one, oily, m.p. 47°–48°;
be. bis[1-(4-m-chlorophenylpiperazino)-3-oxo-4-hexen-5-yl]-sulfide, oily;
bf. 1-(4-m-chlorophenylpiperazino)-5-ethoxy-4-hexen-3-one (cis-trans-isomer mixture), oily;
bg. 1-(4-m-chlorophenylpiperazino)-5-phenoxy-4-hexen-3-one (cis-trans-isomer mixture), oily;
bh. 1-(4-m-chlorophenylpiperazino)-5-mercapto-4-hexen-3-one (cis-trans-isomer mixture; worked up with water and ether), oily;
bi. 1-(4-m-chlorophenylpiperazino)-5-ethylmercapto-4-hexen-3-one (cis-trans-isomer mixture; worked up with water and benzene), oily;
bj. cis-1-(4-m-chlorophenylpiperazino)-5-acetylhydrazino-4-hexen-3-one, m.p. 105°–107°;
bk. cis,cis-N,N'-bis[6-(4-m-chlorophenylpiperazino)-2-hexen-4-on-2-yl]-ethylenediamine, m.p. 120°.

c. A solution of 3.27 g. of 1-(4-m-chlorophenylpiperazino)-5-chloro-4-hexen-3-one (mixture of isomers) in 80 ml. of tetrahydrofuran is saturated with gaseous $NH_3$, allowed to stand for 2 days at 20°, again saturated with $NH_3$, and maintained at 20° for another 2 days. The mixture is then concentrated by evaporation, chromatographed over silica gel with chloroform/methanol, and the thus-obtained product is an oily 1-(4-m-chlorophenylpiperazino)-5-amino-4-hexen-3-one (mixture of isomers), which is further processed immediately.

d. By reacting the products obtained according to paragraphs (ba), (bb), (bc), (bd), (be), (bf), (bg), (bh), (bi), (bj), (bk), or (c) for 1 hour with hydrazine hydrate in acetonitrile or methanol analogously to Example 1(b), 1-[2-(5-methylpyrazolyl-3)-ethyl]-4-m-chlorophenylpiperazine is obtained, m.p. 106°.

EXAMPLE 5 a. A solution of 1.90 g. of 1-chloro-5-acetoxy-4-hexen-3-one (obtainable by reacting isopropenyl acetate with 3-chloropropionyl chloride in the presence of $AlCl_3$) in 15 ml. of acetonitrile is added dropwise under cooling and agitation to a solution of 3.93 g. of 1-m-chlorophenylpiperazine in 10 ml. of acetonitrile; the reaction mixture is allowed to stand for 1 hour at 25°, filtered, the filtrate is evaporated, the residue is extracted with ether, and again evaporated, thus obtaining an oily 1-(4-m-chlorophenylpiperazino)-5-acetoxy-4-hexen-3-one.

Analogously, by reacting
1-chloro-5-ethoxy-4-hexen-3-one
1-chloro-5-phenoxy-4-hexen-3-one
1-chloro-5-ethylmercapto-4-hexen-3-one
(respectively obtainable from ethylisopropenyl ether, phenylisopropenyl ether, or ethylisopropenyl sulfide, with 3-chloropropionyl chloride in the presence of $AlCl_3$) with 1-m-chlorophenylpiperazine, the following products are obtained:

1-(4-m-chlorophenylpiperazino)-5-ethoxy-4-hexen-3-one
1-(4-m-chlorophenylpiperazino)-5-phenoxy-4-hexen-3-one
1-(4-m-chlorophenylpiperazino)-5-ethylmercapto-4-hexen-3-one.

b. The products obtained according to (a) are converted analogously to Example 1(b) with hydrazine hydrate into 1-[2-(5-methylpyrazolyl-3)-ethyl]-4-m-chlorophenylpiperazine (m.p. 106°).

EXAMPLE 6

A solution of 7.87 g. of 1-m-chlorophenylpiperazine in 15 ml. of acetonitrile is added dropwise under agitation to a solution of 1.67 g. of 4,6-dichloro-3-hexen-2-one (obtainable by reacting 4-chloro-1-butyne with acetyl chloride) in 40 ml. of acetonitrile; the reaction mixture is refluxed for 1 hour, cooled, and the thus-formed 1-m-chlorophenylpiperazine hydrochloride is filtered off. The filtrate contains 4,6-bis(4-m-chlorophenylpiperazino)-3-hexen-2-one which is not isolated. Under agitation, 0.8 ml. of 80% strength hydrazine hydrate is added to the reaction mixture, the latter is stirred for 2 hours at 25°, and concentrated by evaporation. The residue is dissolved in a mixture of acetone, benzene, chloroform, and methanol (4:3:2:1), filtered over silica gel, and evaporated, thus producing 1-[2-(5-methylpyrazolyl-3)-ethyl]-4-m-chlorophenylpiperazine, m.p. 106°.

EXAMPLE 7

Under agitation, a solution of 38.4 g. of 1-m-chlorophenylpiperazine in 80 ml. of acetonitrile is added dropwise to a solution of 9.4 g. of 1-hexen-4-in-3-one in 200 ml. of acetonitrile; the reaction mixture is refluxed for 1 hour, and the thus-obtained 1,5-bis(4-m-chlorophenylpiperazino)-4-hexen-3-one is reacted analogously to Example 3 with hydrazine hydrate to produce 1-[2-(5-methylpyrazolyl-3)-ethyl]-4-m-chlorophenylpiperazine (m.p. 106°).

The same compound is obtained analogously from 5-hexen-3-in-2-one (producible by reacting acetaldehyde with the sodium compound of 1-butyn-3-ene to 5-hexen-3-in-2-ol and oxidation with $MnO_2$) by way of 4,6-bis(4-m-chlorophenylpiperazino)-3-hexen-2-one.

EXAMPLE 8

Under agitation, cooling, and introduction of nitrogen, a solution of 5.9 g. of m-chlorophenylpiperazine in 5 ml. of acetonitrile is added dropwise to a solution of 1.44 g. of trans-2-chloro-2,5-heptadien-4-one (obtainable by the reaction of 2-chloropropene with 3-chlorobutyric acid chloride in $CCl_4$ in the presence of $AlCl_3$ at 0°–5° and chromatography of the thus-obtained mixture [b.p. 85°–89°/12 mm.] of cis- and trans-2-chloro-2,5-heptadien-4-one, as well as cis- and trans-2,6-dichloro-2-hepten-4-one on silica gel with ether/petroleum ether) in 5 ml. of acetonitrile. The reaction mixture is agitated for 1 hour, filtered, evaporated, and the thus-obtained crude trans-2,6-bis(m-chlorophenylpiperazino)-2-hepten-4-one (5 g.) is dissolved in 40 ml. of acetonitrile; 0.62 g. of 80% strength hydrazine hydrate is added dropwise to the reaction mixture, and the latter is stirred for 1 hour at 20°. After evaporation and chromatography on silica gel, 1-[1-(5-methylpyrazolyl-3)-propyl-2]-4-m-chlorophenylpiperazine is produced. Trihydrochloride hemihydrate, m.p. 195°–196° (decomposition).

By the use of methylhydrazine in place of the hydrazine hydrate, one obtains a mixture of 1-[1,5-dimethylpyrazolyl-3)-propyl-2]-4-m-chlorophenylpiperazine [trihydrochloride · 3.5 $H_2O$, m.p. 149°–150° (decomposition)] and 1-[1-(1,3-dimethylpyrazolyl-5)-propyl-2]-4-m-chlorophenylpiperazine (trihydrochloride dihydrate, m.p. 116°–118°) which can be separated by chromatography on silica gel.

EXAMPLE 9

1.53 g. of trans-1,5-dichloro-1-penten-3-one is dissolved in 10 ml. of dioxane, mixed dropwise under stirring with a solution of 7.87 g. of 1-m-chlorophenylpiperazine in 15 ml. of dioxane, refluxed for 20 minutes, and cooled. The thus-formed 1-m-chlorophenylpiperazine hydrochloride is filtered off. The filtrate contains trans-1,5-bis(4-m-chlorophenylpiperazino)-1-penten-3-one, which is not isolated. Under agitation, the filtrate is mixed with 0.63 g. of 80% strength hydrazine hydrate, refluxed for 2 hours, evaporated, and worked up analogously to Example 3, thus obtaining 1-[2-(pyrazolyl-3)-ethyl]-4-m-chlorophenylpiperazine, m.p. 119°–120°; trihydrochloride monohydrate, m.p. 188°–190° (decomposition).

EXAMPLE 10

A solution of 6.48 g. of 1-phenylpiperazine in 30 ml. of benzene is mixed with a solution of 2.42 g. of 1,4-dibromo-3-penten-2-one (cis-trans-mixture; obtainable from bromoacetyl bromide and propyne in the presence of $AlCl_3$) in 20 ml. of benzene. The reaction mixture is allowed to stand at 20° for 4 days with occasional shaking. The thus-formed 1-phenylpiperazine hydrobromide is filtered; the filtrate, which contains 1,4-bis(4-phenylpiperazino)-3-penten-2-one, is mixed with a solution of 0.32 g. of hydrazine in 5 ml. of tetrahydrofuran, stirred for 3 hours at 20°, worked up, and the thus-obtained product is 1-(5-methylpyrazolyl-3-methyl)-4-phenylpiperazine, m.p. 146°–147°.

Analogously, the following compounds are produced with the corresponding arylpiperazines:

1,4-bis(4-o-chlorophenylpiperazino)-3-penten-2-one
1,4-bis(4-m-chlorophenylpiperazino)-3-penten-2-one
1,4-bis(4-p-chlorophenylpiperazino)-3-penten-2-one
1,4-bis(4-m-tolylpiperazino)-3-penten-2-one
1,4-bis(4-p-tolylpiperazino)-3-penten-2-one
1,4-bis(4-p-methoxyphenylpiperazino)-3-penten-2-one
1,4-bis(4-m-trifluoromethylphenylpiperazino)-3-penten-2-one and from these compounds, with hydrazine, one obtains the following products:

1-(5-methylpyrazolyl-3-methyl)-4-o-chlorophenylpiperazine, dihydrochloride, m.p. 225°–227°;
1-(5-methylpyrazolyl-3-methyl)-4-m-chlorophenylpiperazine, trihydrochloride-ethanol solvate, m.p. 190°–194° (decomposition);
1-(5-methylpyrazolyl-3-methyl)-4-p-chlorophenylpiperazine, m.p. 138°–140°;
1-(5-methylpyrazolyl-3-methyl)-4-m-tolylpiperazine, dihydrochloride, m.p. 214°–217°;
1-(5-methylpyrazolyl-3-methyl)-4-p-tolylpiperazine, m.p. 140°–142°;
1-(5-methylpyrazolyl-3-methyl)-4-p-methoxyphenylpiperazine, m.p. 156°–157°;
1-(5-methylpyrazolyl-3-methyl)-4-m-trifluoromethylphenylpiperazine, trihydrochloride hydrate, m.p. 159°–162°.

Analogously, 1,6-bis(4-m-chlorophenylpiperazino)-5-hepten-4-one and
1,6-bis(4-o-chlorophenylpiperazino)-5-hepten-4-one, respectively, are obtained from 1,6-dichloro-5-hepten-4-one (cis-trans-mixture; producible from 4-chlorobutyryl chloride and propyne in the presence of $AlCl_3$) with 1-m-chloro- and 1-o-chlorophenylpiperazine, respectively (48 hours at 80°), and from the two above-cited compounds, the following products are obtained with hydrazine:

1-[3-(5-methylpyrazolyl-3)-propyl]-4-m-chlorophenylpiperazine, trihydrochloride hydrate, m.p. 158°–160°;
1-[3-(5-methylpyrazolyl-3)-propyl]-4-o-chlorophenylpiperazine, dihydrochloride hydrate, m.p. 152°–154°.

In an analogous manner, from 1,7-dichloro-6-octen-5-one (cis-trans-mixture; obtainable from 5-chlorovaleryl chloride and propyne in the presence of $AlCl_3$) with 1-phenyl-, 1-o-chlorophenyl-, and 1-p-methoxyphenylpiperazine, respectively (48 hours at 80°), the following compounds are produced:

1,7-bis(4-phenylpiperazino)-6-octen-5-one
1,7-bis(4-o-chlorophenylpiperazino)-6-octen-5-one
1,7-bis(4-m-chlorophenylpiperazino)-6-octen-5-one
1,7-bis(4-o-tolypiperazino)-6-octen-5-one
1,7-bis(4-p-tolylpiperazino)-6-octen-5-one
1,7-bis(4-m-trifluoromethylphenylpiperazino)-6-octen-5-one
1,7-bis(4-p-methoxyphenylpiperazino)-6-octen-5-one, and from the above compounds, with hydrazine, the compounds set forth below are obtained:

1-[4-(5-methylpyrazolyl-3)-butyl]-4-phenylpiperazine, m.p. 80°–82°;
1-[4-(5-methylpyrazolyl-3)-butyl]-4-o-chlorophenylpiperazine, trihydrochloride, m.p. 182°–184°;
1-[4-(5-methylpyrazolyl-3)-butyl]-4-m-chlorophenylpiperazine, trihydrochloride, m.p. 185°–187°;
1-[4-(5-methylpyrazolyl-3)-butyl]-4-o-tolylpiperazine, trihydrochloride, m.p. 208°–210°;
1-[4-(5-methylpyrazolyl-3)-butyl]-4-p-tolylpiperazine, m.p. 95°–97°;
1-[4-(5-methylpyrazolyl-3)-butyl]-4-m-trifluoromethylphenylpiperazine, trihydrochloride, m.p.

175°–177°;

1-[4-(5-methylpyrazolyl-3)-butyl]-4-p-methoxy-phenylpiperazine, m.p. 111°–113°.

EXAMPLE 11

Under agitation, a solution of 19.7 g. of m-chlorophenylpiperazine in 40 ml. of acetonitrile is added dropwise to a solution of 4.4 g. of "mixture A" (see Example 1(a)) in 100 ml. of acetonitrile; the reaction mixture is refluxed for 1 hour, cooled, and the thus-formed 1-m-chlorophenylpiperazine hydrochloride is filtered. The filtrate contains 1,5-bis(4-m-chlorophenylpiperazino)-4-hexen-3-one, which is not isolated, but rather mixed under stirring with 1.85 g. of acetyl hydrazine, refluxed for 3 hours, and evaporated. Chromatography on silica gel yields a mixture of 1-[2-(1-acetyl-5-methylpyrazolyl-3)-ethyl]-4-m-chlorophenylpiperazine and 1-[2-(1-acetyl-3-methylpyrazolyl-5)-ethyl]-4-m-chlorophenylpiperazine. The mixture results in a maleate of the melting point 145°–147°.

Analogously, the following compounds are produced:

with butyrylhydrazine, a mixture of 1-[2-(1-butyryl-5-methylpyrazolyl-3)-ethyl]-4-m-chlorophenylpiperazine and 1-[2-(1-butyryl-3-methylpyrazolyl-5)-ethyl]-4-m-chlorophenylpiperazine (the mixture yields a picrate, m.p. 132°–134°);

with benzoylhydrazine, a mixture of 1-[2-(1-benzoyl-5-methylpyrazolyl-3)-ethyl]-4-m-chlorophenylpiperazine and 1-[2-(1-benzoyl-3-methylpyrazolyl-5)-ethyl]-4-m-chlorophenylpiperazine (the mixture yields a hydrochloride, m.p. 228°–230°);

with cinnamoylhydrazine, a mixture of 1-[2-(1-cinnamoyl-5-methylpyrazolyl-3)-ethyl]-4-m-chlorophenylpiperazine and 1-[2-(1-cinnamoyl-3-methylpyrazolyl-5)-ethyl]-4-m-chlorophenylpiperazine (the mixture yields a hydrochloride, m.p. 225°–227°);

with p-aminobenzoylhydrazine, a mixture of 1-[2-(1-p-aminobenzoyl-5-methylpyrazolyl-3)-ethyl]-4-m-chlorophenylpiperazine and 1-[2-(1-p-aminobenzoyl-3-methylpyrazolyl-5)-ethyl]-4-m-chlorophenylpiperazine (the mixture yields a hydrochloride hemihydrate which escapes at 200°);

with 3,4,5-trimethoxybenzoylhydrazine, a mixture of 1-{2-[1-(3,4,5-trimethoxybenzoyl)-5-methylpyrazolyl-3]-ethyl}-4-m-chlorophenylpiperazine and 1-{2-[1-(3,4,5-trimethoxybenzoyl)-3-methylpyrazolyl-5]-ethyl}-4-m-chlorophenylpiperazine (oily; NMR signals at the following p.p.m. values: 2.24; 2.26; 2.60 – 2.80; 3.12 – 3.26; 3.84; 3.86; 3.89; 6.08; 6.12; 6.56 – 6.69; and 7.00 – 7.39);

with semicarbazide, a mixture of 1-[2-(1-aminocarbonyl-5-methylpyrazolyl-3)-ethyl]-4-m-chlorophenylpiperazine and 1-[2-(1-aminocarbonyl-3-methylpyrazolyl-5)-ethyl]-4-m-chlorophenylpiperazine;

with 4,4-dimethylsemicarbazide, a mixture of 1-[2-(1-dimethylaminocarbonyl-5-methylpyrazolyl-3)-ethyl]-4-m-chlorophenylpiperazine (hydrochloride, m.p. 198°–200°) and 1-[2-(1-dimethylaminocarbonyl-3-methylpyrazolyl-5)-ethyl]-4-m-chlorophenylpiperazine (hydrochloride monohydrate, m.p. 145°–147°);

with the ethyl ester of hydrazinecarboxylic acid, a mixture of 1-[2-(1-ethoxycarbonyl-5-methylpyrazolyl-3)-ethyl]-4-m-chlorophenylpiperazine and 1-[2-(1-ethoxycarbonyl-3-methylpyrazolyl-5)-ethyl]-4-m-chlorophenylpiperazine (the mixture yields a dihydrochloride monohydrate, m.p. 150°–152°).

EXAMPLE 12 a. Under stirring and ice cooling, a solution of 1.67 g. of 1,4-dichloro-4-hexen-3-one (b.p. 64°–66°/0.15 mm.; obtainable by reacting 2-chloro-2-butenic acid chloride with ethylene in the presence of AlCl₃ in CCl₄ at 30°) is mixed dropwise with a solution of 3.93 g. of 1-m-chlorophenylpiperazine in 15 ml. of acetonitrile. The mixture is agitated for 1 hour at 25°, the thus-precipitated 1-m-chlorophenylpiperazine hydrochloride is filtered, and the filtrate is evaporated. The residue is extracted with ether, the ether solution is dried and evaporated, thus producing an oily, stereochemically uniform 1-(4-m-chlorophenylpiperazino)-4-chloro-4-hexen-3-one.

The same compound is analogously obtainable by reacting 2.04 g. of 1,4,5-trichlorohexan-3-one (b.p. 67°–70°/0.1 mm.; producible from 2,3-dichlorobutyric acid chloride and ethylene in the presence of AlCl₃ in CCl₄ at 0°–5°) with 5.9 g. of 1-m-chloro-phenylpiperazine.

b. 3.27 g. of oily 1-(4-m-chlorophenylpiperazino)-4-chloro-4-hexen-3-one is dissolved in 10 ml. of acetonitrile and mixed with 0.63 g. of 80% strength hydrazine hydrate. The precipitate which is first obtained is dissolved later on to the largest part. Thereafter, a new precipitate is formed consisting of 3-[2-(4-m-chlorophenylpiperazino)-ethyl]-5-methylpyrazole monohydrochloride, m.p. 217°–218°; free base, m.p. 106°.

EXAMPLE 13

Analogously to Example 3, by reacting 1,5-dichloro-4-nonen-3-one (cis-trans-mixture; obtainable from 1-hexyne and 3-chloropropionyl chloride in the presence of AlCl₃) with 1-m-chlorophenylpiperazine, 1,5-bis(4-m-chlorophenylpiperazino)-4-nonen-3-one (not isolated) is obtained, and therefrom, one produces, with hydrazine hydrate, 1-[2-(5-n-butylpyrazolyl-3)-ethyl]-4-m-chlorophenylpiperazine; trihydrochloride monohydrate, m.p. 181°–182°.

EXAMPLE 14

Analogously to Example 1(a), the following compounds are obtained from 1-m-fluorophenylpiperazine, 1-m-bromophenylpiperazine, and 1-(3-chloro-4-methoxyphenyl)-piperazine, respectively:

cis-1-(4-m-fluorophenylpiperazino)-5-chloro-4-hexen-3-one trans-1-(4-m-fluorophenylpiperazino)-5-chloro-4-hexen-3-one cis-1-(4-m-bromophenylpiperazino)-5-chloro-4-hexen-3-one trans-1-(4-m-bromophenylpiperazino)-5-chloro-4-hexen-3-one cis-1-[4-(3-chloro-4-methoxyphenyl)-piperazino]-5-chloro-4-hexen-3-one trans-1-[4-(3-chloro-4-methoxyphenyl)-piperazino]-5-chloro-4-hexen-3-one and from these compounds, with hydrazine hydrate, the following products are obtained analogously to Example 1(b):

1-[2-(5-methylpyrazolyl-3)-ethyl]-4-m-fluorophenyl-piperazine, m.p. 152°;

1-[2-(5-methylpyrazolyl-3)-ethyl]-4-m-bromophenyl-piperazine, m.p. 94°;

1-[2-(5-methylpyrazolyl-3)-ethyl]-4-(3-chloro-4-methoxyphenyl)-piperazine, trihydrochloride monohydrate, m.p. 209°–211°.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of this invention to adapt it to various usages and conditions.

What is claimed is:

1. An arylpiperazine of the formula

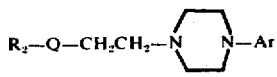

wherein $R_2$ is H or alkyl of 1–4 carbon atoms; Q is $-CX_1=CH-CO-$, $-CH=CX_1-CO-$, $-CHX_1-CHX_1-CO-$, $-CO-CH=CX_1-$, $-CO-CX_1=CH-$ or $-CO-CHX_1-CHX_1-$, in which $X_1$ is Cl, Br or

wherein Ar is phenyl or phenyl substituted by one of alkyl of 1–4 carbon atoms, alkoxy of 1–4 carbon atoms, trifluoromethyl and halogen, or a physiologically acceptable acid addition salt thereof.

2. A compound of claim 1 wherein $X_1$ is Br.
3. A compound of claim 1 wherein $X_1$ is Cl.
4. A compound of claim 1 wheren Ar is o-tolyl, m-tolyl, p-tolyl, o-chlorophenyl, m-chlorophenyl or p-chlorophenyl.
5. A compound of claim 4 wherein Ar is m-chlorophenyl.
6. A compound of claim 1 wherein $R_2$ is alkyl of 1–4 carbon atoms.
7. A compound of claim 6 wherein $R_2$ is methyl.
8. A compound of claim 1 wherein Q is $-CX_1=CH-CO-$.
9. A compound of claim 8 wherein $X_1$ is Br.
10. A compound of claim 8 wherein $X_1$ is Cl.
11. A compound of claim 10 wherein Ar is o-tolyl, m-tolyl, p-tolyl, o-chlorophenyl, m-chlorophenyl or p-chlorophenyl.
12. A compound of claim 11 wherein Ar is m-chlorophenyl.
13. A compound of claim 12, cis-1-(4-m-chlorophenyl)-piperazino-5-chloro-4-hexene-3-one.
14. A compound of claim 12, trans-1-(4-m-chlorophenyl)-piperazino-5-chloro-4-hexene-3-one.

* * * * *